(No Model.) 2 Sheets—Sheet 1.

W. B. GREGORY.
TIRE.

No. 588,823. Patented Aug. 24, 1897.

Witnesses:—

Inventor:—
William B. Gregory
by his Attorneys
Mason, Fenwick & Lawrence (No Model.) 2 Sheets—Sheet 2.
W. B. GREGORY.
TIRE.

No. 588,823. Patented Aug. 24, 1897.

Witnesses:— Inventor:—

UNITED STATES PATENT OFFICE.

WILLIAM B. GREGORY, OF WASHINGTON, DISTRICT OF COLUMBIA.

TIRE.

SPECIFICATION forming part of Letters Patent No. 588,823, dated August 24, 1897.

Application filed July 28, 1896. Serial No. 600,793. (No model.)

*To all whom it may concern:*

Be it known that I, WILLIAM B. GREGORY, a citizen of the United States, residing at Washington, in the District of Columbia, have invented certain new and useful Improvements in Tires; and I do hereby declare the following to be a full, clear, and exact description of the invention, such as will enable others skilled in the art to which it appertains to make and use the same.

My invention relates to improvements in cushion-tires, and has more particular relation to tires formed of woven metal springs.

The invention consists of a hollow internal support for an outer yielding protecting-casing, comprising a tube formed of woven spring metallic strips compressed by machinery in the weaving operation, so that their edges are closely adjoined and so that practically interstices are not left between the edges of the strips.

It also consists of certain other novel constructions, combinations, and arrangements of parts, all of which will be hereinafter more particularly set forth and claimed.

Figures 1, 2:
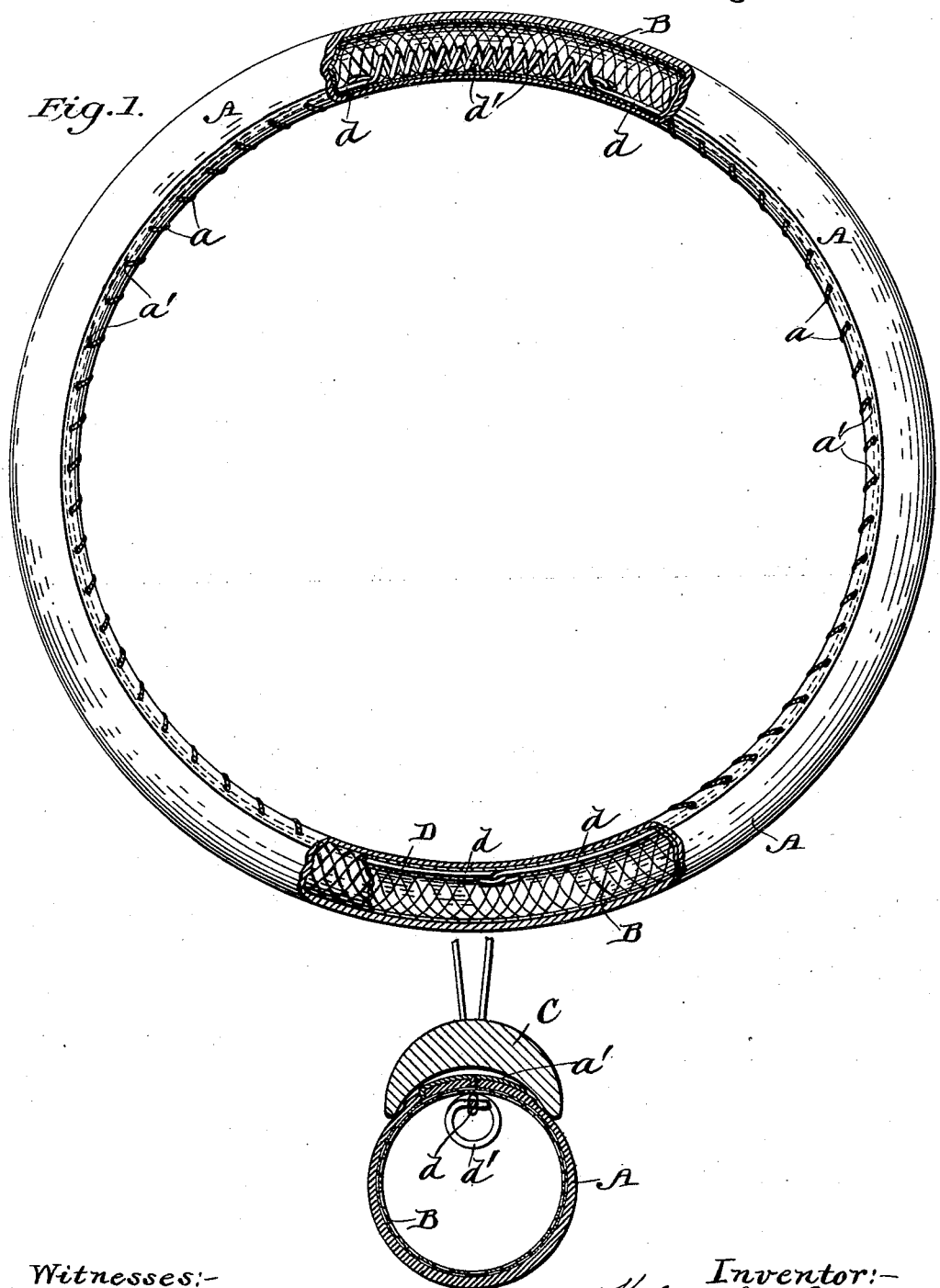
Figure 3:
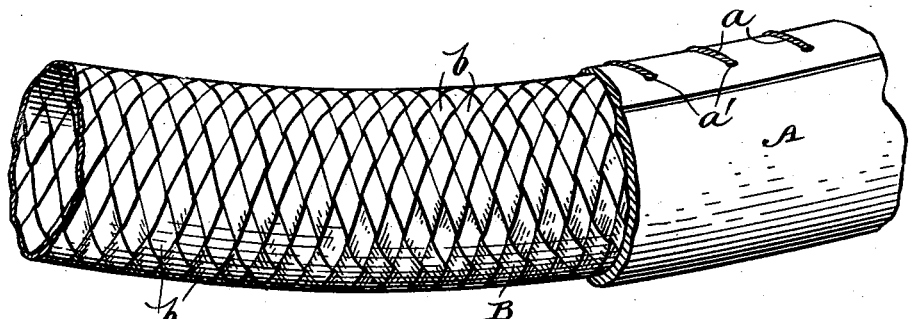
Figure 4:
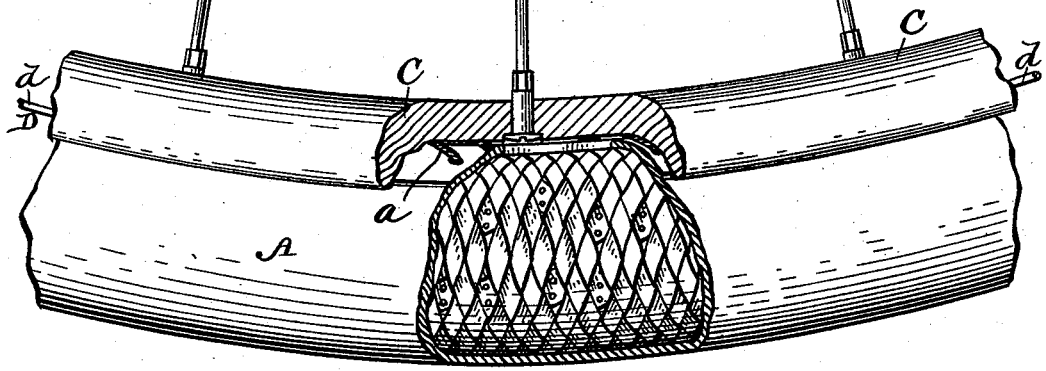

In the accompanying drawings, forming part of this specification, Figure 1 represents a side elevation, partly in section, of a tire embodying my invention. Fig. 2 represents a transverse section through the same. Fig. 3 represents an enlarged detail perspective view of a portion of my tire; and Fig. 4 represents an enlarged detail side elevation, partly broken away, of my tire applied to a wheel-rim.

A in the drawings represents the outer covering or casing of the tire; B, the woven tube; C, the wheel-rim, and D the retaining-band within the tube. The woven tube B is composed of strips or bands $b$ of tempered steel springs woven together in a spiral manner, a portion of the bands passing from right to left and the remainder from left to right. This weaving of the bands is accomplished by machinery and in such manner that the edges of the strips are forced close together, so as to leave in the finished tube practically no open space between the strips into which, together with portions of the casing, pebbles and other foreign substances by embedment into the yielding casing might be forced, and thus caused to bend or fracture the said springs. The opposite ends of the several strips are riveted together, so as to form a continuous endless tube. These connected ends may also be soldered, as well as riveted, if so desired, to insure additional strength.

The outer covering or casing A is preferably constructed of a combination of rubber and canvas and is applied about the woven tube by lacings $a$, passed through eyes $a'$ in the edges of said covering.

My improved tire is held in position upon the rim C by means of a binder or retaining-band D within the same. This band comprises two wires $d\ d$, attached to the respective ends of a coil-spring $d'$, the opposite ends of said wires being hooked together.

It will be observed from the above that the tire is held firmly in position upon the rim by spring-pressure.

This tire has all the advantages of the pneumatic tire and none of its disadvantages, because it is not capable of puncture and does not require to be filled by a pump.

By constructing the tire with the spiral springs lying with their edges close together or in contact all chance of breaking the springs is obviated, as no obstruction forcing its way through the casing can find an opening in the woven tube into which it can wedge itself.

The tire is also perfectly resilient, as the coil-spring strips can move independently of each other to the desired extent for securing this result.

In the manufacture of my improved support it may be found practical to employ spring-wires which are round or elliptical in cross-section, but I regard the flat metal ribbon strips the best on account of their lightness and strength.

Having now described my invention, what I claim as new, and desire to secure by Letters Patent, is—

In a cushion-tire, the combination of an outer protecting-casing, a hollow support within the same, comprising a tube formed of a series of flat woven metallic spring strips, or wires, compressed by machinery in the weaving operation, so that their edges are adjoined, and practically there are no interstices between the strips, or wires, a retaining-band within the tire provided with a spring; and a rim; whereby the tire is held firmly upon the rim when applied thereto, substantially as described.

In testimony whereof I hereunto affix my signature in presence of two witnesses.

WILLIAM B. GREGORY.

Witnesses:
  E. T. FENWICK,
  THOS. J. STALEY.